United States Patent [19]
Morimatsu et al.

[11] Patent Number: 5,412,617

[45] Date of Patent: May 2, 1995

[54] HIGH RESOLUTION MEASURING METHOD AND APPARATUS

[75] Inventors: Hideharu Morimatsu, Kobe; Toyoki Sasakura, Ashiya, both of Japan

[73] Assignee: Furuno Electric Company, Limited, Hyogo, Japan

[21] Appl. No.: 39,298

[22] PCT Filed: Jun. 26, 1992

[86] PCT No.: PCT/JP92/00817

§ 371 Date: Apr. 22, 1993

§ 102(e) Date: Apr. 22, 1993

[30] Foreign Application Priority Data

Jun. 26, 1991 [JP] Japan .................................. 3-154503

[51] Int. Cl.⁶ ........................ G01S 15/89; G01S 13/90; G01S 7/52
[52] U.S. Cl. ...................................................... 367/88
[58] Field of Search ............................ 367/88; 342/25

[56] References Cited

U.S. PATENT DOCUMENTS 4,088,978  5/1978  Gilmour ................................ 367/88

*Primary Examiner*—Daniel T. Pihulic

[57] ABSTRACT

An underwater sonar measuring method using synthetic aperture technique which radiates an ultrasonic signal to targets by a transmission transducer unit (1B), receives echo signals reflected by the targets by moving reception transducer units (1A, 1B, 1C) at a plurality of points, adjusts a plurality of signals received in phase and combines the resultant phase-shifted signals. The reception transducer units are moved over a distance less than the length "L" of the transmission transducer unit during a period for an ultrasonic signal going to and returning from a target. The signals received and phase-combined during this period are multiplyed by the radiated signals so that there are eliminated grating lobes appearing on both sides of the main lobe when an aperture synthesis is performed, and thus a high resolution measurement is made.

4 Claims, 7 Drawing Sheets

HIGH RESOLUTION MEASURING METHOD AND APPARATUS

TECHNICAL FIELD

The present invention relates to a measuring method or apparatus which uses a synthetic aperture technique to achieve a high resolution measurement.

BACKGROUND ART

In order to obtain a higher resolution in searches using waves, in general, the length of a sensor has to be lengthened. Assuming that the length of a sensor is "L" and the wavelength is "λ", it is known that resolution "θ" (°) is expressed by an equation $\theta = 50.6 \, \lambda/L$.

In searching a deep sea by using a side-looking scanning sonar or a MNBES which are capable of achieving high resolution, a sensor (transmitting and receiving transducer unit) cannot be made so large, since a low carrier frequency has to be used to decrease propagation loss and the size of the sensor is limited due to installation thereof on ship's bottom. Actually, an upper limit of practical resolution "θ" is 2°. The resolution of 2° can be said as a sufficiently high resolution for apparatuses of this type. Even with this resolution, when the sea bottom is searched at a depth of 6,000 meters and at a straight line distance of 7,000 meters in a downwardly tilted direction, distance resolution in a right-and-left direction will be as follows:

$$7,000 \times \sin(2°) = 244 \, m$$

Thus, resolution will be degraded in direct proportion to distance between the sensor and a target. In order to increase resolution on the sea bottom, it may be possible to use a measuring method for bringing down a sensor and maintaining it at a depth close to the sea bottom. In such a case, however, there are faced many difficulties such as the high cost of a towed body and cables and the like, and also problems such as successive measurements at desired points in the water.

There has been introduced a synthetic aperture technique employed in side-looking radar apparatuses (side-watching radars) to achieve high resolution in "Science on Radio Wave Images" (written by Suguru Matsuo and published by Zenkoku Shuppan) or in "Waves and Images" (written by Takuei Sato and others and published by Morikita Shuppan). The technique will be briefly explained by referring to these works.

With radar apparatuses of a general type (radars having an aperture-type antenna), an aircraft Y (FIG. 1) has room to equip only a small-sized antenna so that a beam having a wide range angle β is obtained, as shown in FIG. 1. An ellipse area Q on the ground illuminated thereby will have a resolution which is low as shown in FIG. 1. By applying a synthetic aperture technique to the radar, however, (resolution in the x direction) will be considerably improved as represented by an area A. Distance resolution (z direction) can also be improved by another means (pulse compression) as represented by an area B. As a result, a considerably higher resolution can be obtained as represented by an intersected area C.

Radio waves having a wavelength "λ" and a beam angle "β" are radiated in a downwardly tilted side direction as shown in FIG. 2. Reception signal levels of echoes resulting therefrom are recorded. A target Tg on the ground is illuminated by radar beams while the aircraft passes points a, b, c, . . . on the flight course. Echoes resulting therefrom are recorded and, at a later time, phase-combined (Echoes are brought in phase and combined), which is equivalent to detecting the target by an antenna substantially having a length ae.

When the target Tg is detected by a radar apparatus at a point C and having a beam angle β, the beam is expanded to $\beta R = L$ at a distance R as explained in the foregoing, which is bearing resolution on the ground. While, with a synthetic aperture antenna, the beam angle β' is expressed as $\beta' = \lambda/ae = \lambda/L$. Thus, resolution on the ground will be as $\beta'R = (\lambda/ae) \cdot R \approx D$. This means that resolution is the same as the length D of the antenna. Further, this resolution is irrespective of distance between a radar apparatus and a target.

With regard to improvement of bearing resolution, there is used the pulse compression technique employed by conventional pulse compression radar apparatuses (chirp radar apparatuses). In order to improve distance resolution, a narrow-width pulse is required to be generated. For this reason, a linearly frequency-modulated pulse is used. There is radiated a transmission signal having its frequency linearly modulated (FM with frequency-shift f) within a transmission pulse width. At a receiver, signals are passed through a matched filter with characteristics having a linear relationship between frequency and delay time so that output signals having an envelope waveform (short pulses) are obtained. The larger the product of frequency shift f by pulse width T, (i.e., the bigger the pulse compression ratio becomes, the narrow the pulse width results).

Accordingly, if the synthetic aperture technique is applied to underwater detection systems, it can be easily expected that improvement of resolution is obtained. As will be explained hereinafter, this has not been yet achieved, since propagation speed of ultrasonic signals in the water is considerably slower than that of radio waves and this is the principal cause for the synthetic aperture technique not being more widely applied.

DISCLOSURE OF THE INVENTION

The present invention is made to solve the foregoing problems. An object of the present invention is to provide a measuring method and an apparatus performing the method which are capable of achieving a high resolution measurement in underwater detection systems by solving problems appearing in applying a synthetic aperture technique as has been used in radar apparatuses.

A first feature of the present invention is to provide a high resolution measuring method using an aperture synthesis technique for radiating ultrasonic signals in a beam to objects by means of a transmission transducer unit, receiving echo signals reflected by objects by means of a moving reception transducer unit at a plurality of points, adjusting a plurality of signals in phase and combining the resultant phase-shifted signals. The method includes the steps of moving the reception transducer unit over a distance less than the length "L" of the transmission transducer unit during a time period for an ultrasonic signal going to and returning from an object, and of multiplying the signals received and phase-combined by the signals transmitted so that grating lobes on both sides of the main lobe in relation to the phase-combined signals are eliminated.

A second feature of the present invention is that a plurality, n, of reception transducer units are disposed at intervals of the length of a transmission transducer unit "L" and the reception units are moved over a distance less than a length "L×n" during a time period for an ultrasonic signal going to and returning from an object. This enables a ship to move at a higher speed.

A third feature of the present invention is that m search signals are radiated and the reception transducer unit is moved over a distance less than L (the length of the transmission transducer unit)×m during a time period for an ultrasonic signal going to and returning from an object.

A fourth feature of the present invention results from a combination of the second feature and the third feature of the present invention. This feature is capable of greatly increasing the speed of a ship.

The synthetic aperture technique moves a sensor and at the same time radiates ultrasonic signals and receives echo signals reflected by the sea bottom, which increases the apparent aperture length of the sensor. Assuming that a distance between the ship and the sea bottom is 7,000 meters, the round-trip time for an ultrasonic signal is 9.3 seconds. Thus, if the repetition period for radiating ultrasonic signals is set as 10 seconds (a little longer than 9.3), transmission and reception transducer units are disposed every unit distance over which the ship moves in 10 seconds. When the speed of a ship is 5 knots, the apparent distance interval between adjacent transmission and reception transducer units is 25 meters. Assuming that 12 kHz is used as the carrier frequency of an ultrasonic signal, the wavelength thereof is 12.5 cm. Accordingly, the transmission and reception transducer units are equivalently disposed every 200λ, as shown in FIG. 3.

When distance intervals between adjacent transmission and reception units are set as $n_1$ (λ) and signals received by the transmission and reception units and resulting from the echoes are adjusted to be in phase and then combined (called as "phase combination"), side lobes 42 are generated respectively at successive angles starting at two angles very close to the main beam (main lobe) 41 as shown in FIG. 4. These side lobes are substantially the same as the main lobe in terms of sensitivity. These side lobes are called grating lobes. The angle α (°) for grating lobes being generated is given by an equation $\alpha = \sin^{-1}(1/n_1)$. When distance intervals between adjacent transmission and reception units are set as 200λ, the angle α for grating lobes being generated is 0.29°.

FIG. 5 shows only a main lobe obtained by combining, in phase, reception signals without any grating lobes being generated. FIG. 8 shows a target being searched. When a lobe having ideal characteristics as shown in FIG. 5 is used, a target is measured as shown in FIG. 8. While, when a pair of grating lobes are generated on both sides of the main lobe, two ghost images are produced as shown in FIG. 9. It is to be noted that, when there is used a main lobe having degraded characteristics (i.e., a broad lobe as shown in FIG. 7), a target shown in FIG. 8 is measured and is indistinguishable as shown in FIG. 10.

In order to eliminate such grating lobes, the equivalent distance interval between adjacent transmission and reception transducer units has to be nearly 0.5λ (=6.25 cm). A distance over which a ship travels in 10 seconds of 6.25 cm results in the ship being substantially stopped. Thus, it is nearly impossible to make searches in the water. Even if it were possible, it takes too long a time to make searches at such a low speed in a large water area.

Measures to eliminate grating lobes will be examined hereinafter.

1) Measures to decrease the allowable proximity angle of grating lobes by narrowing the directional characteristics of a transmission beam.

Synthetic aperture systems having a short length of transmission unit are capable of improving resolution, since resolution is equivalent to the length of a transmission transducer unit. But, when the length of a transmission transducer unit is short, inherent directional characteristics will become broad so that an allowable proximity angle cannot be made small. One effective means to decrease the allowable proximity angle of grating lobes is achieved by comparatively increasing the length of a transmission transducer unit and making the transmissional directional characteristics narrow, more or less, at the cost of resolution. Actually, the length of a transmission transducer unit is 3 to 4 meters.

Assuming that carrier frequency of an ultrasonic signal is 12 kHz (wavelength: 12.5 cm) and the length L of a transmission transducer unit is 3.2 m (25.6λ), the extension angle α (°) of a transmission beam is calculated in accordance with $\beta = \sin^{-1}(\lambda/L)$ and thus β=2.24°. The transmission beam obtained is shown in FIG. 11.

If an angular interval α at which grating lobes are generated with signals combined by aperture synthesis is larger than 2.24° as shown in FIG. 12, grating lobes shown in FIG. 12 and the main lobe in a transmission beam shown in FIG. 11 are not overlapped with one another. This angle is called an allowable proximity angle with grating lobes. When the transmission beam shown in FIG. 11 is multiplied by the reception beam shown in FIG. 12, all the grating lobes will be eliminated to derive only the main lobe as shown in FIG. 13.

Accordingly, if the angular interval α is larger than 2.24°, in other words, the speed of a ship for ten seconds is slower than 3.2 meters (less than 0.64 knots), aperture synthesis becomes possible.

2) To increase reception signal density by multiple reception.

Ideally, every time a pair of reception transducer units S move 3.2 meters in ten seconds echo signals reflected by a target T are received, as shown in FIG. 14. The speed of a ship can be further increased to a practical speed by incorporating a plurality of pairs of reception transducer units spaced at given intervals therebetween and performing a multiple reception. With the foregoing method 1), the distance interval between adjacent transmission and reception units can be set as 3.2 meters. Thus, the speed of a ship can be increased to 3.2×U, by disposing a plurality of reception transducer units U at space intervals of 3.2 m. For example, as shown in FIG. 15, echo signals reflected by a target T are received at the same instant by reception units $S_1$ and $S_2$ which are spaced at an interval of 3.2 m and are further received 10 seconds later by the reception units $S_1'$ and $S_2'$ which are moved 6.4 m respectively. This is equivalent to receiving echo signals by reception transducer units disposed at intervals of 3.2 m. In this case, the speed of the reception units $S_1$ and $S_2$, i.e., the speed of the ship will be 1.28 knots which is 2×0.64 knots. If three reception units are installed, the speed of the ship is tripled.

3) To increase reception signal density by multiple transmission.

Sound reproducing systems employ, generally, a method for radiating a first ultrasonic signal by a transmission and reception transducer unit and not emitting a second ultrasonic signal by a time instant at which echo signals reflected by the sea bottom and resulting from the first signal are received thereby. In relation to the present invention, there may be presented a method for increasing reception signal density by successively radiating ultrasonic signals and receiving echo signals from the sea bottom, i.e., a multiple transmission. This technique is used for aperture synthesis in a measuring apparatus installed in a satellite.

In order to achieve this object, echo signals reflected by the sea bottom and resulting from respective transmission signals are required to be distinguished from echo signals resulting from other transmission signals. Thus, it is necessary to make the time period between pulses short so that echo signals resulting from transmission signals are not overlapped with echoes from the sea bottom.

FIG. 16 shows a manner for seaching the sea bottom from a point A through another point B by using a transmission beam having a vertical directional angle $\phi_1$. The searched result is shown in FIG. 17. FIG. 19 shows images representing the sea bottom from a point A' through the other point B' searched by a transmission beam having a directional angle $\phi_2(<\phi_1)$ as shown in FIG. 18. From a comparison between FIG. 16 and FIG. 18, it can be seen that the more acute the directional angle of a transmission beam becomes, the narrower a search width (illuminated width) becomes. From a comparison between FIG. 17 and FIG. 19, it can be understood that if the sound-illuminated width is narrow, the transmission time interval between transmission pulses "P" can be shortened. With the directional angle $\phi_2$ shown in FIG. 18, the time interval "t" of the transmission pulses "P" can be made substantially the same as the sound-illuminated width A'B'. FIG. 21 shows a relationship between transmission pulses "P" and echoes "R". Echo signals "Ri" result from pulses "Pi". When search signals are radiated V times, the speed of the ship will be 0.64·V knots.

When the foregoing technique 2) and the technique 3) are combined, with the number of transmission/reception transducer units installed being "U" and with "V" multiple transmissions for the speed of the ship can be 0.64·U·V knots, which can be easily put into practice.

BRIEF DESCRIPTION OF DRAWINGS

FIG. 22 shows a control block diagram of one embodiment of an underwater detection system according to the present invention.

DETAILED DESCRIPTION

Figure 1:
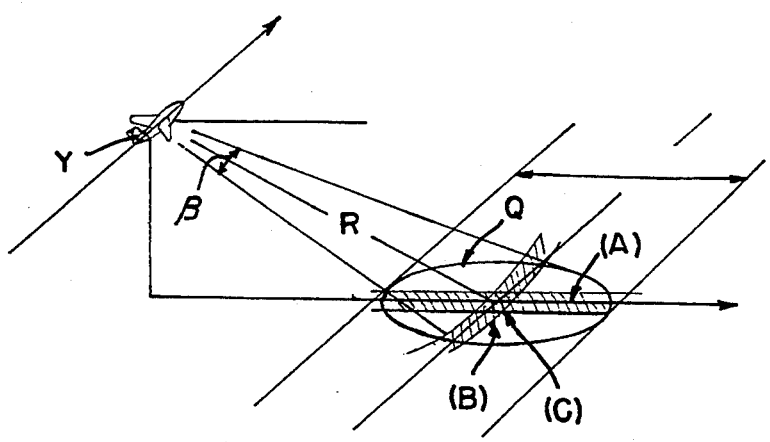
FIG. 1 shows a diagram for explaining a prior art synthetic aperture technique used in radar apparatuses.
Figure 2:
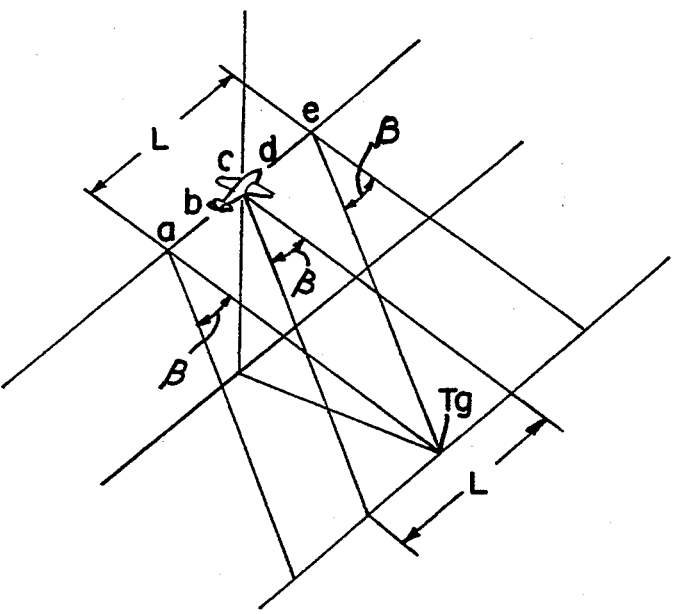
FIG. 2 shows a diagram for explaining a prior art synthetic aperture technique used in radar apparatuses.
Figure 3:
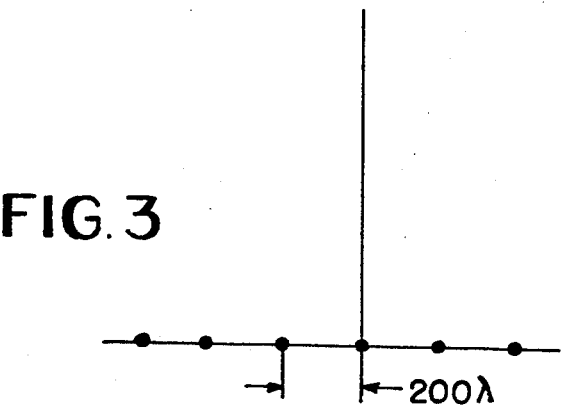
FIG. 3 shows an arrangement in which a plurality of sensors are disposed at equal intervals, which is obtained by one sensor and a synthetic aperture technique.
Figure 4:
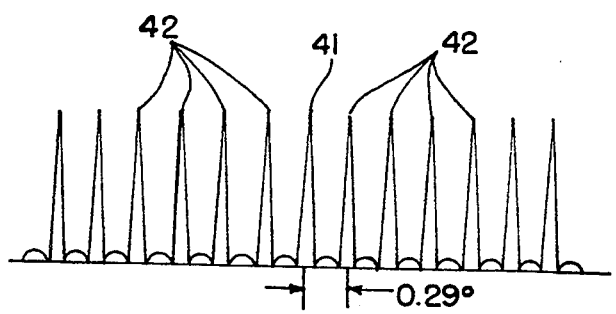
FIG. 4 shows grating lobes in addition to the main lobe generated when a synthetic aperture technique is applied to an underwater detection system.
Figure 5:
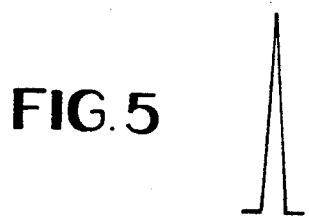
FIG. 5 shows a waveform diagram having only a main lobe.
Figure 6:
FIG. 6 shows a waveform diagram having a main lobe and a pair of grating lobes which straddle of the main lobe.
Figure 7:
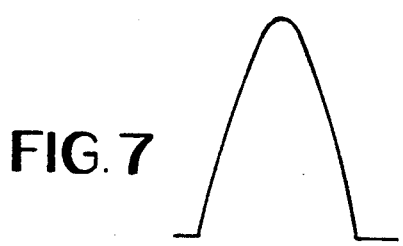
FIG. 7 shows a main lobe an FIG. 5, but wherein the main lobe is broad.
Figure 8:
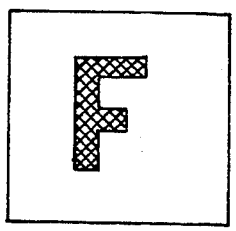
FIG. 8 shows an example of a target being searched.
Figure 9:
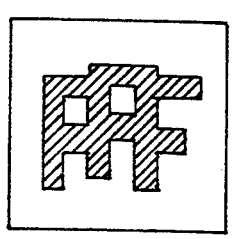
FIG. 9 shows an actual search result indicating a target in FIG. 8 when the waveform shown in FIG. 6 is used.
Figure 10:
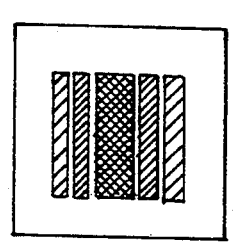
FIG. 10 shows an actual search result indicating a target in FIG. 8 when the waveform shown in FIG. 7 is used.
Figure 11:
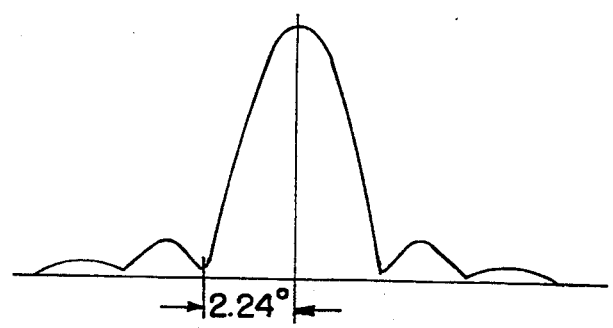
FIG. 11 shows the directional characteristics of a transmission beam used in the present invention.
Figure 12:
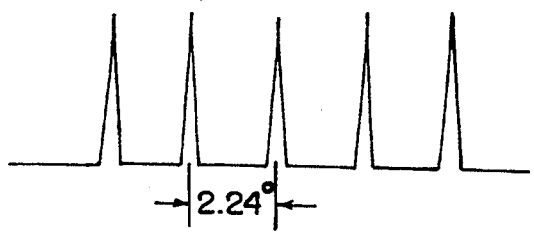
FIG. 12 shows reception beams obtained by combining reception signals when the transmission beam in FIG. 11 is used.
Figure 13:
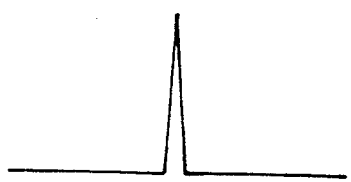
FIG. 13 shows signals obtained by multiplying the transmission beam shown in FIG. 11 by the reception beam shown in FIG. 12.
Figure 14:
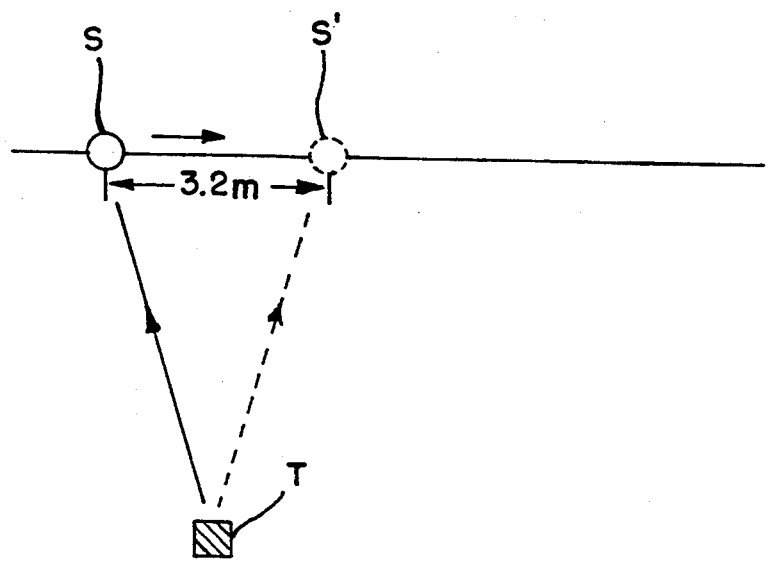
FIG. 14 shows a diagram for explaining a synthetic aperture technique applied in underwater detection systems.
Figure 15:
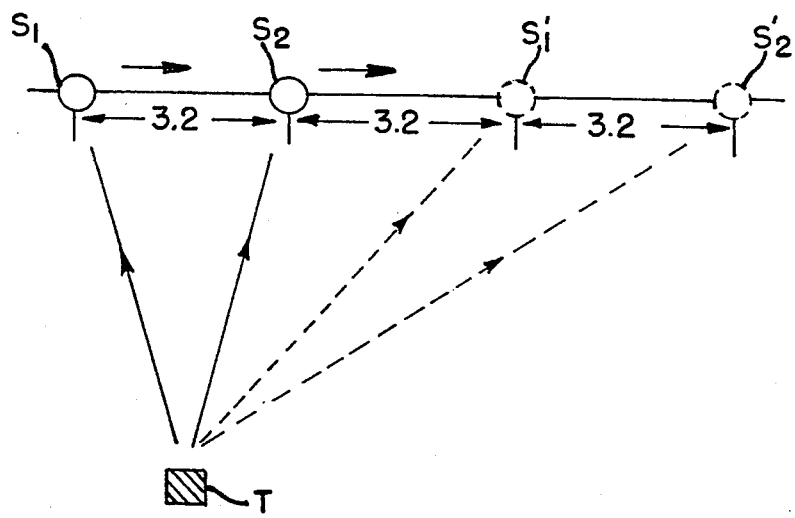
FIG. 15 shows a diagram for explaining a synthetic aperture technique when two pairs of reception transducer units are installed in FIG. 14.
Figure 16:
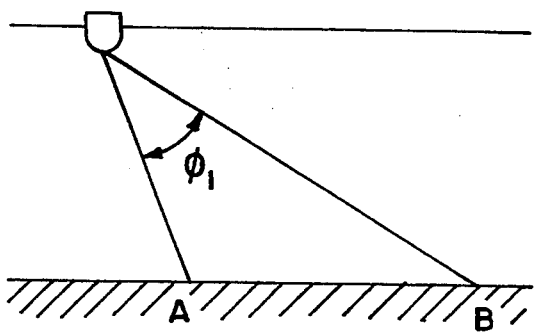
FIG. 16 shows a diagram illustrating the vertical extension of an ultrasonic beam directed in a downwardly tilted direction.
Figure 17:
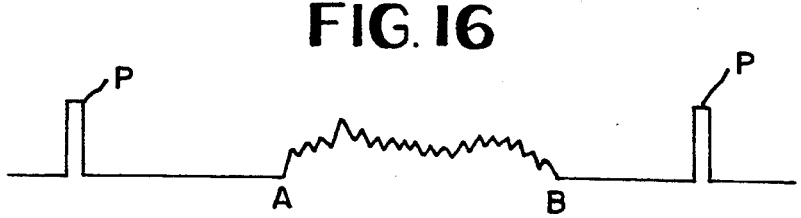
FIG. 17 shows a measurement diagram when the sea bottom is searched by a transmission beam having the directional angle shown in FIG. 16.
Figure 18:
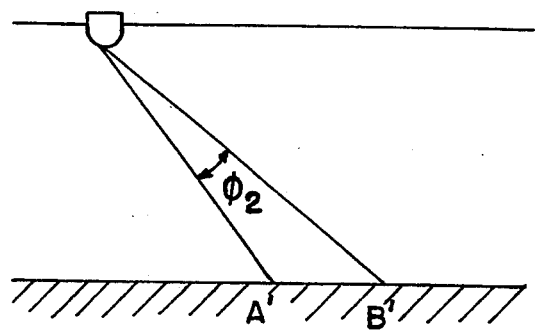
FIG. 18 shows an ultrasonic beam obtained by narrowing the vertical extension of the beam shown in FIG. 16.
Figure 19:
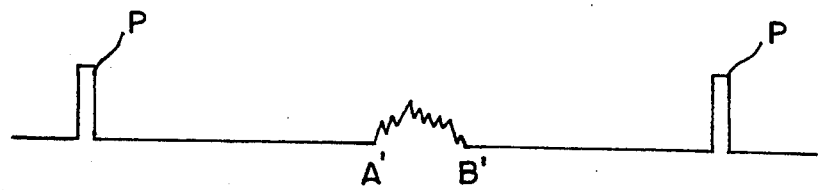
FIG. 19 shows a measurement diagram when the sea bottom is searched by a transmission beam having the directional angle shown in FIG. 18.
Figure 20:
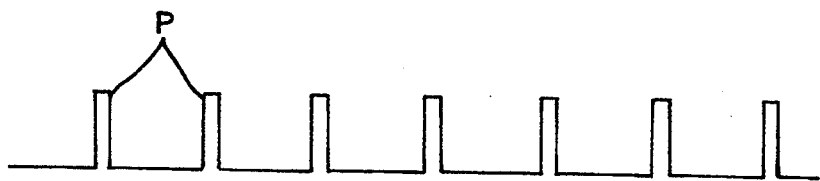
FIG. 20 shows a diagram in which a plurality of pulses are radiated during one period of the transmission pulses shown in FIG. 19.

A transducer module 1 comprises a reception transducer unit 1A, a transmission and reception transducer unit 1B and a reception transducer unit 1C disposed at uniform space intervals, for example, 3.2 meters. The length of the transmission and reception transducer unit 1B is 3.2 meters. Since three reception transducer units are installed, the speed of a ship will be 0.64×3 knots in accordance with the foregoing relationship. It is to be noted that these three transmission and reception transducer units can be easily installed on the bottom of the ship, since they are disposed in an advancing direction of the ship. A circuit 2 functions to switch between transmission and rception operations of the transducer module 1. Reception amplifiers 3 amplify reception signals through three channels from the transducer module 1 respectively. An A/D converter 4 converts analog output signals of the reception amplifiers 3 to digital signals. Interfaces 5 and 7 function with respect to a CPU 6. The CPU 6 performs computations on reception signals transmitted through the three channels and inputted through the interface 5 for aperture synthesis. This will be explained in detail hereinafter. A recorder 8 indicates obtained search results based on output signals supplied from the CPU 6 through the interface 7. A data storing device 9 stores the obtained search results as data. An external data input unit 10 is inputted with positions of the sensor 1, bearing and water depths and the like. A transmission control unit 11 determines transmission intervals and the pulse width of transmission signals. A transmission amplifier 12 outputs transmission signals which are supplied to the transmitting and receiving transducer unit of the transducer module through the transmission and reception switching unit 2.

Figure 23:
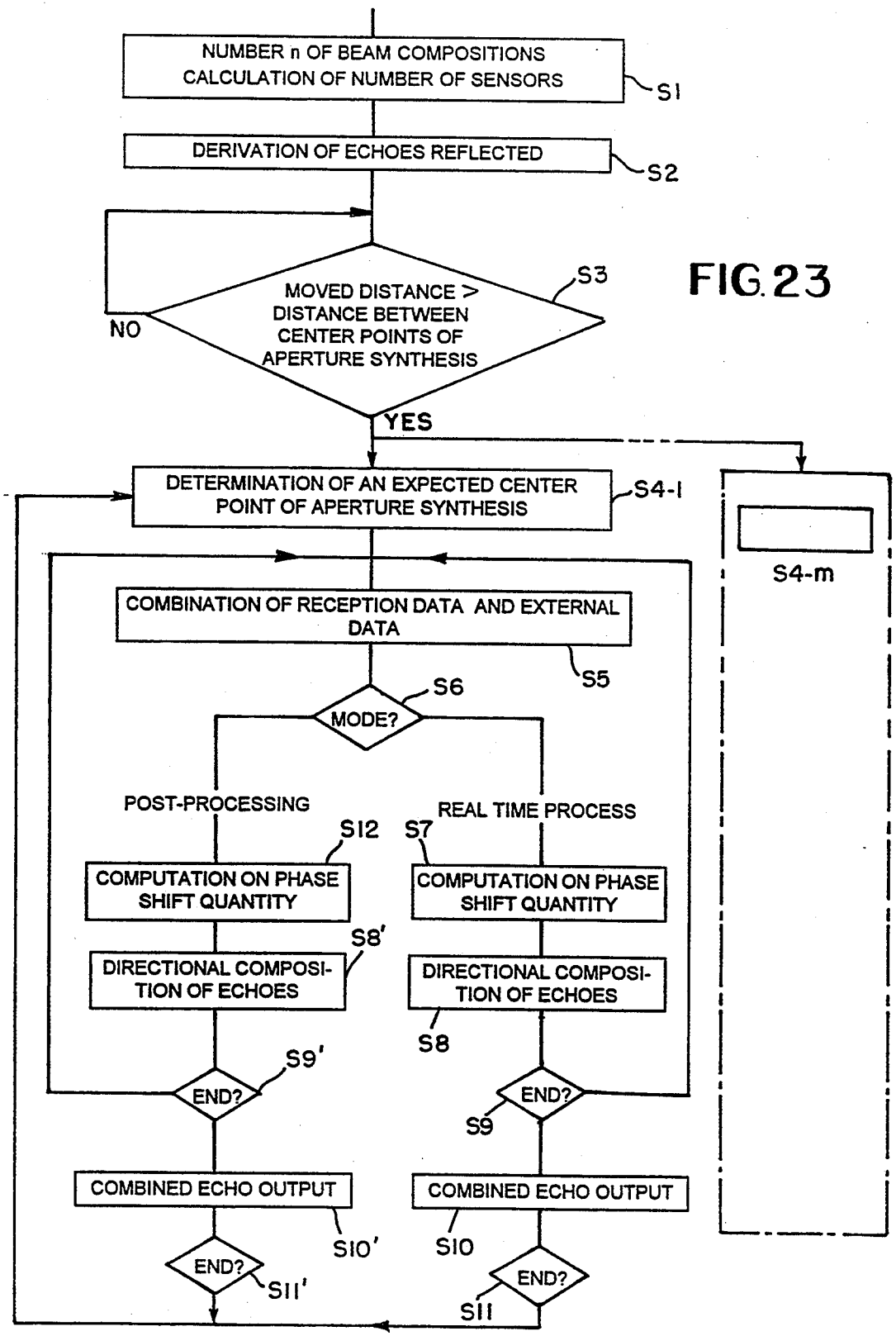
FIG. 23 shows a flow chart representing control operations performed by the CPU shown in FIG. 22.

Aperture synthesis computations performed at the CPU 6 will be explained by referring to a flow chart shown in FIG. 23. It is to be noted that aperture synthesis itself is known and the details thereof are left to special works. Here, it will be explained briefly.

With aperture synthesis functions, there are a real time mode and a post-processing mode.

With a real time mode, an aperture synthesis is performed and resultant signals are outputted to the recorder 8 without any delays with respect to ship's movement (or within a given time, even if it is delayed). With this mode, computations for exact phase compensation and the like cannot be made, but approximate computations are made instead.

In the post-processing mode, the computation become large and cannot be processed in real time, since exact computations are required. Measured raw data are first stored in the data storing device 9 and, at a later time, are taken out thereof and computed by the CPU 6.

At a step S1, calculations are made in accordance with the number of search beams radiated, m, and the number of sensors, n. With this embodiment, the distance, L, between adjacent reception transducer units is 3.2 meters.

At a step S2, there are output echo signals corresponding to a point at which a search signal is emitted and to points determined by a multiple transmission and at which search signals are radiated. At a step S3, it is judged whether a distance traveled by the ship is longer than a distance between two adjacent center points for successful aperture synthesis. When the distance traveled by the ship becomes longer than this distance, an expected future center point "$O_1$" for a synthetic aperture operation is determined at step S4-1.

Figure 21:
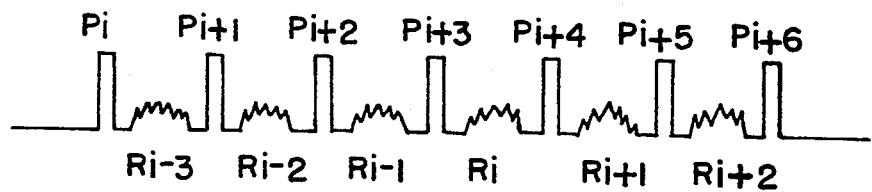
FIG. 21 shows the pulses of FIG. 20 along with search results representing the sea bottom when the transmission pulses shown in FIG. 20 are used.
Figure 22:
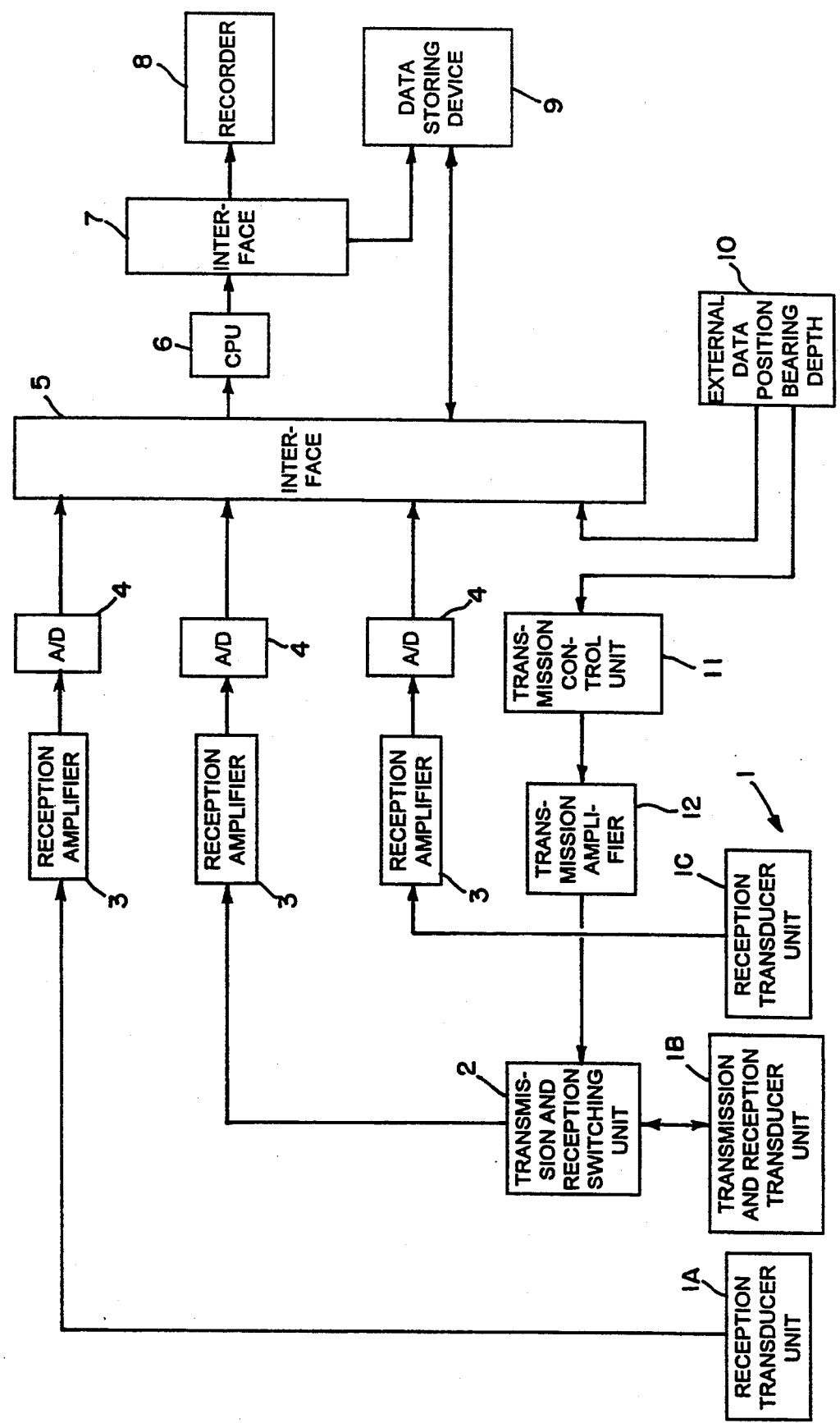
FIG. 22 shows a control block diagram of one embodiment in which the measuring method according to the present invention is advantageously used.

At a step S5, external data (position data) corresponding to a first point at which a transmission signal is radiated are related with reception data ("P", "R" shown in FIG. 21) in a coordinated manner. At a step S6, it is judged whether the real time processing mode or the post-processing mode has been set. If the real time mode has been set, the next step is begun. At step S7 phase shift quantities $C_{i0}$ are computed based on distances between the center point "$O_1$" of an aperture synthesis and points at which echo signals are produced. With this mode, approximate computations are made. A point of reference distance (distance $D_j$) in a search range is fixed so that computations are simplified.

At steps S8 and S9, with the distance $D_j$, echo signals reflected at points spaced by the reference distance are combined in accordance with the following equation.

$$C_1(D_j) + C_2(D_j) + \ldots + C_n(D_j)$$

where "n" indicates the number of sensor units. At a step 10, combined echo signals resulting from real-time computations by the CPU 6 are transmitted to the recorder 8. At a step S11, the foregoing computations are performed by varying the "j" of $D_j$ from j=1 through 1.

The steps after S4-1, explained in the foregoing, are performed in parallel respectively, for respective ones of m radiated beams.

In the post-processing mode, at a step S12, phase shift quantities $C_i$ are computed based on distances between the center point "$O_1$" of an aperture synthesis and points at which the echo signals are produced. In this mode, computations are made by varying the distance $D_j$ in the whole search range so that focussed points are changed (dynamic focus).

Although the foregoing embodiment employs multiple reception, the speed of a ship can be further increased by adding multiple transmission.

EFFECTS PRODUCED BY THE INVENTION

As explained in the foregoing, the present invention moves a reception transducer unit over a distance less than the length of a transmission transducer unit during a period for an ultrasonic signal going to and returning from a target so that an angle at which a grating lobe is generated does not become smaller than the extension angle of a transmission beam. Signals received and phase-combined are multiplyed by the transmitted signals so that grating lobes on both sides of the main lobe are eliminated. As a result, a high resolution measurement becomes possible.

We claim:

1. In a sonar method using a synthetic aperture technique for radiating ultrasonic signals in beam form to objects by means of a transmission transducer unit, receiving echo signals at a plurality of points by means of a moving reception transducer unit, adjusting the phase of a plurality of the received and transduced echo signals, and combining the resultant phase-shifted signals, the improvement comprising the steps of:

radiating ultrasonic signals by means of a transmission transducer unit having the length "L";

moving the reception transducer unit over a distance less than the length "L" of the transmission transducer unit during the time period for an ultrasonic signal going to and returning from an object while receiving echo signals by means of said reception transducer unit at a plurality of points;

adjusting the phase of a plurality of said received and transduced echo signals; and combining the phase-adjusted signals so that grating lobes on both sides of the main lobe are eliminated.

2. In a sonar method using a synthetic aperture technique for radiating ultrasonic signals in beam form to objects by means of a transmission transducer unit, receiving echo signals at a plurality of points by means of a moving reception transducer unit, adjusting the phase of a plurality of the received and transduced echoes of signals, and combining the resultant phase-shifted signals, the improvement comprising the steps of:

radiating ultrasonic signals by means of a transmission transducer unit having the length "L";

disposing a plurality, n, of reception transducer units at a space interval equal to the length "L" of the transmission transducer unit;

moving the reception transducer units over a distance less than the length "L" times "n" during a time period for an ultrasonic signal going to and returning from an object;

receiving echo signals by means of said reception transducer units at a plurality of points;

adjusting the phase of a plurality of said received and transduced echoes of signals; and combining the phase-adjusted signals so that grating lobes on both sides of the main lobe are eliminated.

3. In a sonar method using a synthetic aperture technique for radiating ultrasonic signals in beam form to objects by means of a transmission transducer unit, receiving echo signals at a plurality of points by means of a moving reception transducer unit, adjusting the phase of a plurality of the received and transduced echo signals, and combining the resultant phase-shifted signals, the improvement comprising the steps of:

radiating "m" ultrasonic transmission signals by means of the transmission transducer unit, said unit having a length "L", while moving the reception transducer unit over a distance less than "L" times "m" during the time period for an ultrasonic signal going to and returning from an object;

adjusting the phase of a plurality of said received and transduced echo signals; and combining the phase-shifted signals so that grating lobes on both sides of the main lobe are eliminated.

4. In a sonar method using a synthetic aperture technique for radiating ultrasonic signals in beam form to objects by means of a transmission transducer unit, receiving echo signals at a plurality of points by means of a moving reception transducer unit linear array, adjusting the phase of a plurality of the received and transduced echo signals, and combining the resultant phase-shifted signals, the improvement comprising the steps of:

radiating "m" ultrasonic signals by means of a transmission transducer unit, said unit having the length "L";

receiving echo signals at a plurality of points by means of a linear array of "n" reception transducer units disposed at intervals of the length "L" of the transmitter transducer unit while moving the reception transducer unit array over a distance less than the length "L" times "m" times "n" during the time period for an ultrasonic signal going to and returning from an object;

adjusting the phase of a plurality of said received and transduced echo signals; and combining the phase-adjusted signals so that grating lobes on both sides of the main lobe are eliminated.

* * * * *